US009066275B2

United States Patent
Yan et al.

(10) Patent No.: US 9,066,275 B2
(45) Date of Patent: Jun. 23, 2015

(54) METHOD AND SYSTEM TO IMPROVE DEVICE PINGING

(71) Applicant: Cellco Partnership, Basking Ridge, NJ (US)

(72) Inventors: Lixia Yan, Bedminster, NJ (US); Ravikumar Pattabiraman, Hillsborough, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 361 days.

(21) Appl. No.: 13/728,738

(22) Filed: Dec. 27, 2012

(65) Prior Publication Data

US 2014/0187199 A1    Jul. 3, 2014

(51) Int. Cl.
   *H04M 1/68*   (2006.01)
   *H04W 48/02*  (2009.01)

(52) U.S. Cl.
   CPC ....................... *H04W 48/02* (2013.01)

(58) Field of Classification Search
   USPC .......... 455/410, 39, 352, 334, 423, 550.1, 73, 455/450, 127.5, 343.2, 17
   See application file for complete search history.

(56) References Cited

U.S. PATENT DOCUMENTS

| | | | |
|---|---|---|---|
| 5,142,550 A * | 8/1992 | Tymes | 375/141 |
| 6,621,796 B1 * | 9/2003 | Miklos | 370/236 |
| 8,015,586 B2 * | 9/2011 | Hirai et al. | 725/105 |
| 8,531,949 B2 * | 9/2013 | Forssell et al. | 370/230 |
| 2009/0154443 A1 * | 6/2009 | Forssell et al. | 370/345 |

OTHER PUBLICATIONS

The LTE Network Architecture: A Comprehensive Tutorial; Alcatel Lucent; 2009; 26 pages.

* cited by examiner

*Primary Examiner* — Joseph Arevalo

(57) ABSTRACT

A method and system are provided for determining the network status of a mobile device. A wireless connection between the mobile device and a wireless packet data communication network is established. The mobile device sends a data packet through the network and monitors for a response via the network one or more times within a period or until a response via the network is received. If no response is received via the network, a test message is sent to a dummy server a predetermined number of times within a period or until a response from the dummy server is received. Upon determining that a response from the dummy server has been received, the mobile device deactivates or blocks network access requests originating from the mobile device to the network, unless initiated by a user of the mobile device.

22 Claims, 9 Drawing Sheets

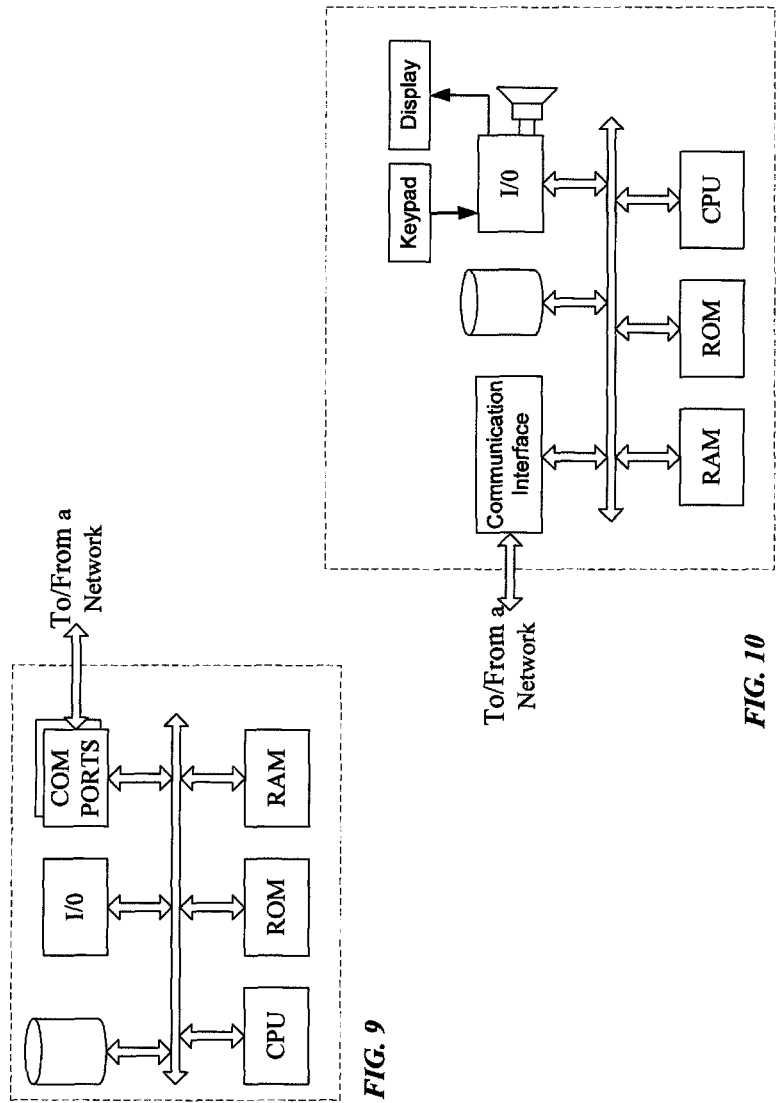

METHOD AND SYSTEM TO IMPROVE DEVICE PINGING

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or e-mail communications via the wireless communication networks. As the public wireless communication networks have evolved to provide greater bandwidth and packet based services, the industry has developed a variety of data services, such as web browsing, as well as a variety of services using multimedia message service (MMS) technology. Further, an ever increasing number of applications running on wireless devices automatically connect to the network for updates and notifications.

Wireless packet data communication is being provided with ever increasing transmission speed. The packet data communication allows mobile device users to expand the scope of their use of the mobile device, for example, to enjoy multimedia services at a speed comparable to those enjoyed via Internet connected personal computers (PCs). The high data speeds coupled with the plethora of available wireless services often lead to situations where account data usage limits are quickly reached.

User accounts supporting data services, alone or in addition to voice and messaging services, now encompass a vast majority of mobile wireless communications accounts. As the packet data communication has become prevalent, multiple forms of payment for network provided data communication services have evolved. Multiple account options with varying amounts of data usage, call time, quality of service and bandwidth allowable are available as postpaid and prepaid communications services. Prepaid service, in which a customer or subscriber has fixed availability of usage of a voice or data resource, is becoming as popular as postpaid options.

Prepaid accounts typically have limits set by the amounts of usage purchased by the users; however, even postpaid accounts may have significant usage thresholds, e.g., beyond which the users pay higher rates per usage or service is terminated. Using the example of a prepaid wireless service, the customer may purchase discrete blocks of time or amounts of data for making voice telephone calls or data communication via a cellular communication network, and then the customer purchases a new block of time or amount of data when the previously purchased block or amount is consumed. If additional block of time or amount of data is not purchased at this point, the respective voice or data service to the device is terminated. Alternatively, a customer may use a postpaid model in which a fixed fee is applied for using a certain amount of a resource within a certain time cycle (e.g., an amount of data or a number of minutes or messages within a month) and which, if used up, may entail a further fee for each use of further resources.

Upon connecting to the wireless communications network, the customer account is authorized and authenticated, and the network allows a voice or data call to proceed. For a prepaid account, the network monitors the customer's usage time or data and decrements from the customer's account. If the account becomes depleted or reaches billing cycle limits, the system can either prompt the customer to purchase more time or data, or the system can terminate the voice or data call. Another prepaid and postpaid plan option, however, enables the customer to budget an amount of airtime that will be used during a certain period of time, insuring that the budget will not be exceeded unless the customer desires more airtime. For example, a customer may opt to limit wireless communication airtime for specific phones in the plan (e.g., to prevent exceeding budgets allocated for their child). A similar plan may be offered for data communications, e.g. with a set limit on the amount of data.

With many of the service plan options outlined above, it is helpful for people to receive notifications of reaching a subscription plan limit or other pre-set usage limit. The wireless communication service providers, however, may not provide immediate notice of reaching a subscription plan limit. Typically, the amount of use with respect to the subscription plan limit is checked after the end of each data communication session or after the end each billing cycle. Further, these notifications typically rely on short message service (SMS) communication, which is not reliable. In this regard, SMS does not provide for feedback from the receiving mobile device to acknowledge receipt of the notification transmission. Limit-related notifications may not be received, and the sending equipment of the service provider does not know to re-send undelivered notifications.

Accordingly, when an account limitation is reached, the mobile device may not be aware that it no longer has data/voice access. Thus, the mobile device may continue pinging (e.g., requesting access to) the network, thereby causing significant overhead in terms of network and communication resources. Accordingly, there is currently no method or system to prevent applications of the mobile device from attempting to connect to the network. As mobile devices are becoming "smarter" by introducing an ever increasing amount of features that use the network, the network resource problem of blocking communication requests with the network is further exacerbated.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 9 illustrates a network or host computer.

FIG. 10 illustrates a computer with user interface elements.

DETAILED DESCRIPTION

Figure 1:
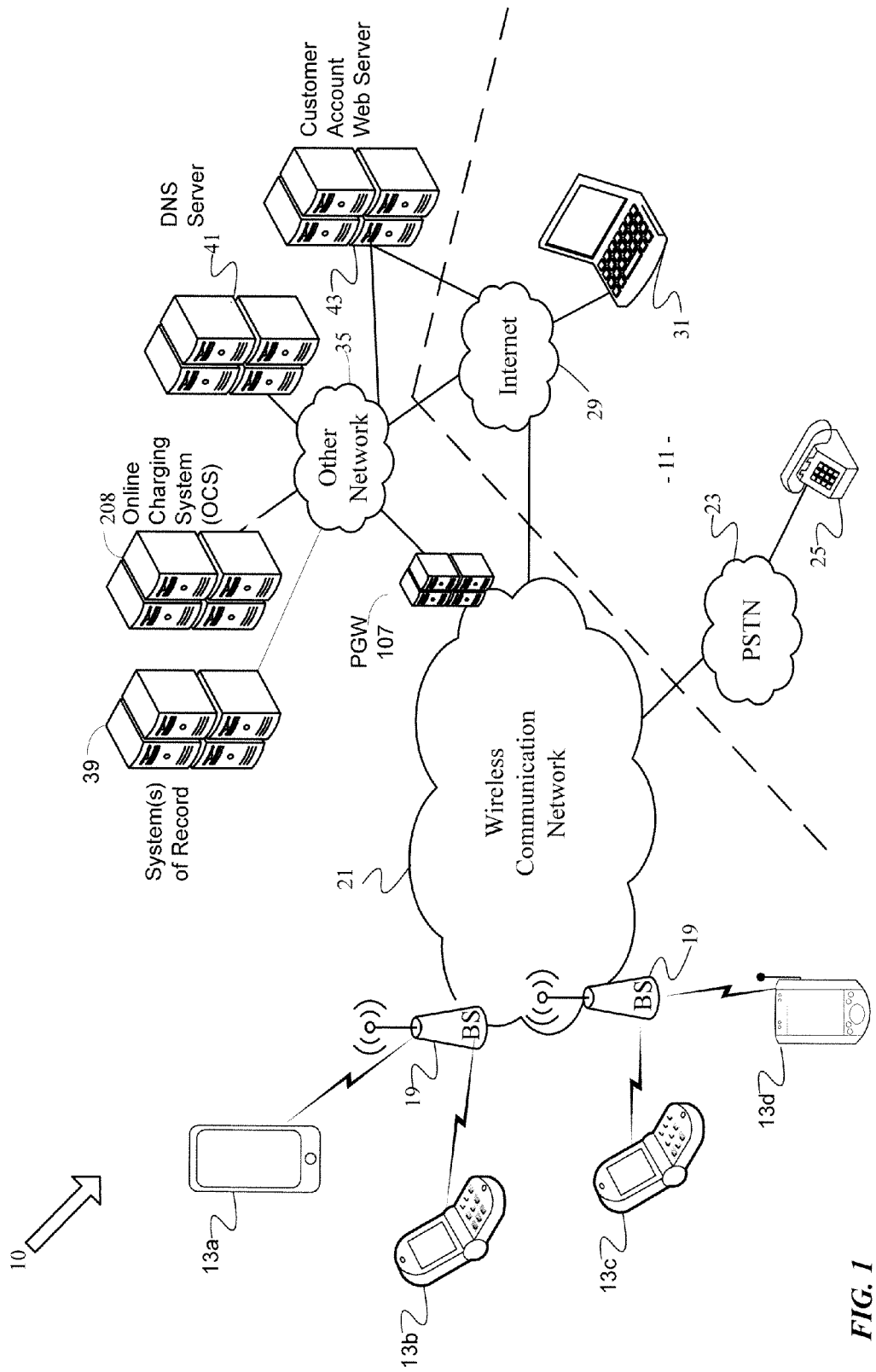
FIG. 1 illustrates a wireless packet data communication network for providing mobile communications for mobile devices, which includes a framework for monitoring mobile device network usage and providing status information to the mobile device.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below enable a mobile device to determine whether service obtained by mobile device through a network has reached or exceeded a usage amount limit set under a subscription plan. In one aspect, the mobile device notifies the user upon determining that operation of the mobile device has met at least one criterion with respect to data usage via a wireless communication network. One such criterion is having met or exceeded a data usage threshold. An account of the mobile device user has predetermined limit or threshold criteria, such as a maximum subscription plan limit or other criteria defined by a user's plan, and data usage balance reflecting an amount of data usage remaining under the plan. In some examples, if at least one criterion (e.g., threshold level of data usage) is met, the mobile device may no longer be able to use the wireless communication network resources under the subscription plan.

The mobile device is able to distinguish between having met at least one criterion (e.g., meeting a threshold level of data usage) from a connection failure (e.g., network error) by attempting to contact one or more dummy servers. For example, the dummy server may be a dedicated DNS server that is configured to receive queries from the wireless device and provide a response—regardless of whether one or more account resources have been depleted. The mobile device determines that device operation has met at least one criterion upon receiving a response from a dummy server. Upon learning that the account has met at least one criterion, the mobile device automatically prevents pinging (e.g., attempting to connect to) the network for communication. Such blocking and/or deactivating automatic network access at the mobile device level preserves network and communication resources. Further, blocking and/or deactivating automatic network access at the mobile device level reduces mobile device battery consumption. User initiated access attempts may be permitted, although they may be redirected so as to prompt the user to increase the usage limit, e.g., by purchasing more usage under a prepaid account plan or confirming that they are accepting additional usage charges. Accordingly, the mobile device deactivates or blocks automatic network access requests and allows user initiated network access requests.

In one example, when the data usage meets a predetermined account criterion and a mobile device initiated communication to the dummy server confirms the same, a notification message is provided on a user interface of the mobile device and an option to change subscription plans is provided. For example, the notification message may be provided in the form of a visual, an audible, and/or a haptic prompt. In one example, the options are provided as pop-ups on the user interface display.

The criterion may be set by the mobile device user, the service provider, or an account holder (who may or may not be the mobile device user—e.g., a parent or relative of the mobile device user). The criterion may include multiple thresholds based on different aspects of the user's plan, for example, voice call minutes or data volume downloaded to the mobile device, and the date/time at which the network can be accessed.

In one aspect, when a mobile device cannot access the services of the wireless communication network resources under the subscription plan, the mobile device determines whether its account has met a criterion by communicating with a dummy server (e.g., by sending out a DNS resolution request to a dummy domain on the dummy server for a dummy DNS address). Receiving a response from the dummy server indicates to the mobile device that there is no network failure; rather, the mobile device has met at least one predetermined account criterion. Accordingly, the mobile device itself is able to ascertain its present network limitation and automatically prevent pinging of the wireless network. For example, the automatic network access requests originating from the mobile device to the network 21 are deactivated or blocked, unless initiated by a user of the mobile device. In one example, the mobile device provides the user an opportunity to remedy the criterion and again restore full communication ability. For example, the determination by the mobile device that the account has exceeded a threshold level of data usage may allow the user to use an appropriate new subscription plan, which could be prepaid or postpaid, or replenish the data allocation for the billing plan. The user may be able to replenish their account by purchasing more credits (e.g., recharge the account). A user may update their subscription plan by selecting a different quality of service (QoS) or a different plan from the provider. If the status of having met a predetermined criterion of data usage is not cured, the mobile device may prevent automatic access of the network by various applications that may run on the mobile device. Preventing access to the network from the root (i.e., at the mobile device level) instead of being rejected by the network reduces the demand on the network and communication resources.

Reference now is made in detail to the examples illustrated in the accompanying drawings and discussed below. FIG. 1 illustrates a number of mobile devices, a mobile communication network coupled to other communication networks and several systems/elements associated with or included in the mobile network for various functions as may be involved in monitoring mobile device data usage, determining whether plan limits have been reached, and blocking automatic pinging of the mobile communication network upon determining that plan limits have been reached.

Hence, FIG. 1 illustrates a mobile communication system 10 as may be operated by a carrier or service provider to provide a wide range of mobile communication services and ancillary services or features to its subscriber customers and associated mobile device users. The elements generally indicated by the reference numeral 10 generally are elements of the system and are operated by or on behalf of the carrier, although the mobile devices typically are sold to the carrier's customers. The wireless communication network 21 provides communications between mobile devices (e.g., 13*a* to 13*d*) as well as communications for the mobile devices with networks and stations 11 outside the mobile communication system 10.

For purposes of later discussion, several mobile devices appear in the drawing, to represent examples of the mobile devices that may receive various services via the wireless communication network 21. Today, mobile devices typically take the form of portable handsets, smart-phones, tablet computers, or personal digital assistants (PDAs), although they may be implemented in other form factors, including consumer and business electronic devices. The mobile devices 13a, 13b, 13c, and 13d, for example, may take the form of a mobile telephone station, enhanced with display and user input capabilities to support certain text and image communications, such as email, picture communication and web browsing applications.

Figure 2:
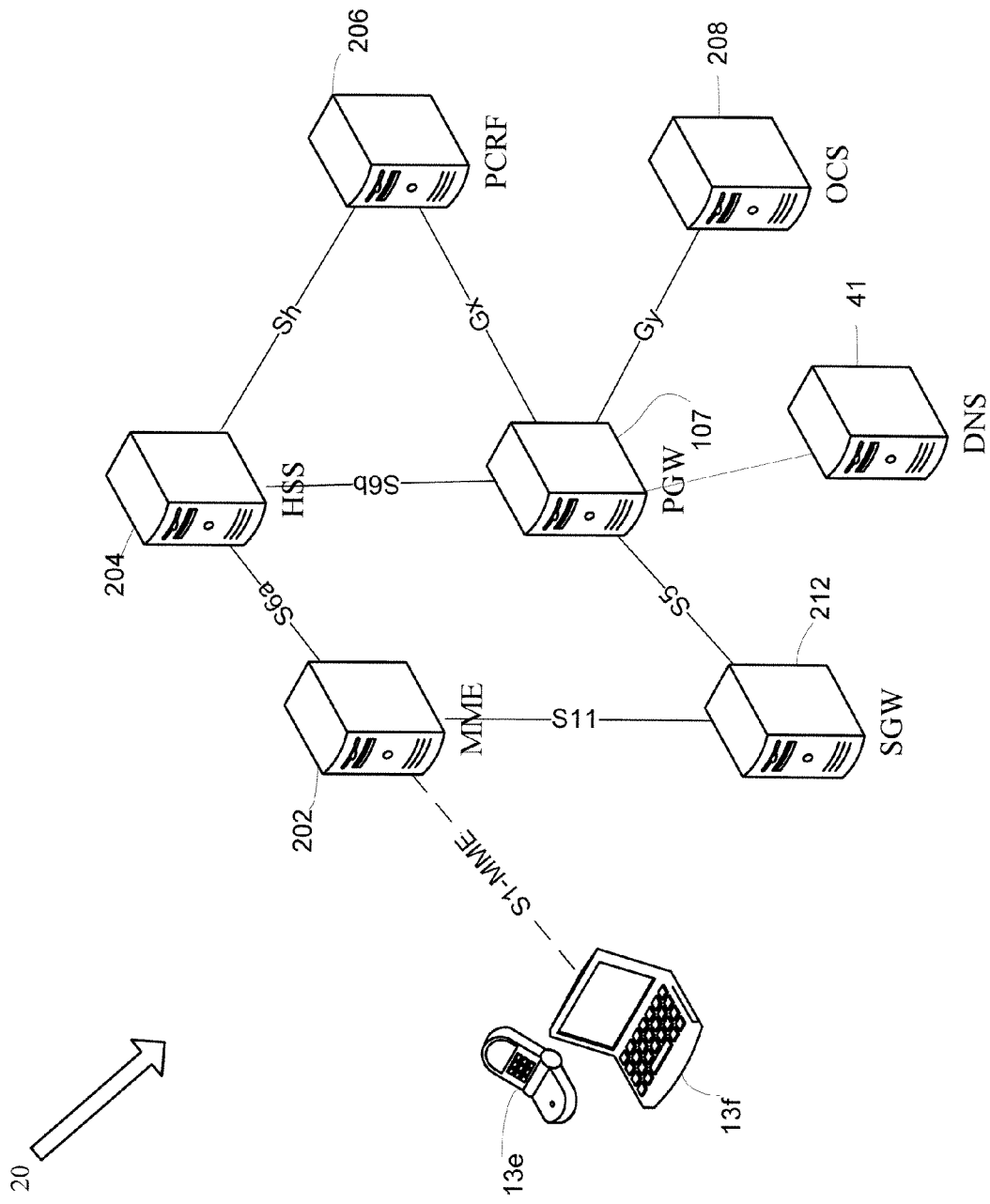
FIG. 2 illustrates a high level interface block diagram depicting an exemplary system which blocks network usage when an account criterion is reached and allows a mobile device to determine when an account criterion is reached.

In another example, as illustrated in FIG. 2, mobile device 13f is a portable computing device, specifically, comprising a wireless modem card inserted into a handheld or laptop personal computer (PC) or the like. Alternatively, the PC may connect to a handset device, similar to the handset type mobile device 13a. The mobile device 13a includes a wireless transceiver compatible with the particular type of packet data service offered by the system 10. For discussion of one usage notification message example and the associated exemplary notification service, we assume that the mobile devices 13a, 13b, 13c, 13d, 13e, and 13f are all covered under one subscriber account, and that among those stations, the mobile device 13a is the station of the account holder (AH).

Returning to FIG. 1, the system 10 allows users of the mobile devices to initiate and receive telephone calls to each other as well as through the public switched telephone network (PSTN) 23 and telephone stations connected thereto. In one example, the system 10 allows SMS type text messaging between mobile devices and similar messaging with other devices via the Internet 29. The system 10 typically offers a variety of other data services via the Internet 29, such as downloads, web browsing, e-mail, etc.

The wireless communication network 21 typically is implemented by a number of interconnected networks. Hence, the overall system 10 may include a number of radio access networks (RANs), as well as regional ground networks interconnecting a number of Radio Access Networks (RANs) and a wide area network (WAN) interconnecting the regional ground networks to core network elements, such as the Multimedia Messaging Service Centers (MMSCs). A regional portion of the system 10, such as that serving mobile devices 13a to 13f will typically include one or more RANs and a regional circuit and/or packet switched network and associated signaling network facilities.

Physical elements of a RAN, operated by one of the mobile service providers or carriers, include a number of base stations represented in the example by the base stations (BSs) 19. Such base stations 19 typically comprise a base transceiver system (BTS) which communicates via an antennae system at the site of base station and over the airlink with one or more of the mobile devices 13a to 13f when the mobile devices are within range. Each base station 19 typically includes a BTS coupled to several antennae mounted on a radio tower within a coverage area often referred to as a "cell." The BTS is the part of the radio network that sends and receives RF signals to/from the mobile devices that the base station currently serves.

The radio access networks also include a wireless communication network represented generally by the cloud at 21, which carries the user communications for the mobile devices 13a to 13f between the respective base stations 19 and other elements with or through which the mobile devices 13a to 13f communicate. Individual elements such as switches and/or routers forming the traffic network 21 are omitted in FIG. 1 for simplicity.

The wireless communication network 21 portion of the mobile communication system 10 connects to a public switched telephone network (PSTN) 23. This allows the system 10 to provide voice grade call connections between mobile devices and regular telephones connected to the PSTN 23. The drawing in FIG. 1 illustrates one such telephone at 25. The PSTN 23 also provides connections to other types of customer premises equipment, such as facsimile or 'FAX' machines (not shown).

The wireless communication network 21 of the system 10 connects to a public packet switched data communication network, such as the network commonly referred to as the "Internet" shown at 29. Packet switched communications via the traffic network 21 and the Internet 29 may support a variety of user services through the system 10, such as mobile device communications of text and multimedia messages, e-mail, web surfing or browsing, programming and media downloading (including audio and video), etc. For example, the mobile devices may be able to receive messages from and send messages to user terminal devices, such as personal computers, either directly (peer-to-peer) or via various servers (not separately shown). The drawing shows one such user terminal device as a personal computer (PC) 31 (or server 31), by way of example.

The carrier also operates a number of systems that provide ancillary functions in support of the communications services provided through the system 10, and those elements communicate with other nodes/elements of the system 10 via one or more private IP type packet data networks 35 (sometimes referred to as an Intranet). The support elements, for example, include one or more systems of record, such as the system shown at 39. For example such a system 39 may include subscriber account records. A large carrier typically has a number of such systems, and the system that stores the account data for a particular subscriber may be referred to as the "system of record" for that subscriber's account.

Some of the users of the mobile devices will subscribe to voice and/or data services under one or more post-pay service plans offered by a carrier or service provider. However, the users or subscribers of other stations will subscribe to voice and/or data services under a plan, in which they pay in advance for an amount of communication service usage. In the examples, usage is measured by duration, e.g., length of time of a voice call, length of time of a data communication session, volume of the consumed data, and/or simply packets of data communicated with a guaranteed QoS supporting real-time communications of an appropriate bandwidth.

For example, the data usage of the mobile device is tracked. This tracking may occur at the PGW server 107 communicating with the mobile device through the wireless communication network 21. The PGW server 107 is the network element that monitors the data usage. It can then be determined, from the user account for the mobile device a first data usage limit and a first data usage time frame. For example, the time frame may be the time of day/week (e.g., 6 a.m. to 6 p.m.; Monday to Friday or weekend). The user account information typically is stored on the server, such as Online Charging System (OCS) server 208. The OCS server 208 can determine whether a criterion is met by comparing the amount of data usage to the first data usage limit and comparing a present time to the first data usage time frame. In this regard, there may be "time of day" restrictions. From this comparison, a data usage amount for the first data usage time frame is determined. Consequently, it can be determined (e.g., by the OCS server 208) whether the data usage amount exceeds the first data usage limit. Upon determining that the data usage amount meets a criterion (e.g., is equal to or exceeds the first data usage limit in the first data usage time frame), the respective mobile device (e.g., 13a) is prevented from accessing the resources under the subscription plan.

Additionally, one or more data usage limits may be compared to other usage limits by the OCS server 208. For example, a second criterion may be related to time of day/week; volume; communication with specific telephone numbers or sites; and the like. For example, there may be fewer or even no restrictions at nights or weekends. Further, certain phone numbers or web sites may be blocked by the account holder. If the second data usage limit meets a respective predetermined usage criterion, the OCS server 208 provides a notification to the PGW 107 to prevent data delivery to the mobile device 13*a*. Accordingly, any outgoing/incoming data packets with respect to the mobile device 13*a* will be dropped. In one example, all data packet traffic is blocked except DNS requests to a "dummy server," which is discussed in more detail below.

The PGW server 107 is part of the data path and monitors how much data is used at any given time. As to the OCS server 208, it instructs the PGW server 107 how much data the user is allowed to use. When the data quota is depleted, the PGW 107 reports this depletion to the OCS server 208 and inquires whether an additional data quota is available. Thus, the PGW 107 makes an initial determination that the data quota is depleted. The OCS server 208 makes the actual determination. Thus, the PGW 107 only knows if the "granted usage allowance" (e.g., data quota assigned) to the account by the OCS server 208 is depleted. When the data quota is depleted, the PGW 107 reports the used usage allowance and sends a request to the OCS 208 for a new "granted usage allowance" (e.g., data quota). The OCS server 208 charges the "used usage allowance" reported by the PGW 108 to the customer account of the mobile device 13*a*, and then determines if the account has enough resources (e.g., money/credit) to grant additional data quota.

For example, when a new data session is launched on a mobile device 13*a*, the PGW 107 sends a request to the OCS server 208 to validate the account of the mobile device. Upon validation (e.g., the account of the mobile device is active and there is sufficient money/credit within the account), the OCS server 208 grants a usage allowance (e.g., 20 MB) and returns the "granted usage allowance" to the PGW server 107. After response is received from the OCS server 208, the PGW server 107 allows the mobile device 13*a* to use the wireless communication network 21 and commences monitoring the data usage. When the allocated data usage quota is depleted, the PGW server 107 sends another request to the OCS server 208 to ask for more "granted usage allowance." However, if the customer has met an account criterion (e.g., is out-of-credit), the OCS server 208 returns a failure notification. The PGW server 107 maintains the data session but prevents the mobile device 13*a* from accessing network resources such as the Internet 29 by dropping the out-going data packets originating from the mobile device 13*a*. However, at this time, the mobile device 13*a* does not know that the subscription plan under its account has met an account criterion (e.g., is out-of-credit). For example, applications on mobile device 13*a* may still attempt to send data packets since data session is still up.

The mobile device (e.g., 13*a*) may include one or more clients (e.g., application programs) that run on the mobile device and that are configured to send a test signal (e.g., Domain Name System (DNS) query) to the dummy server (DNS server 41) in response to not being able to use the wireless communication network resources under the subscription plan (e.g., wireless call, internet access, SMS message, automatic update, etc.). For simplicity, the one or more clients that perform the DNS query are collectively referred herein as a test program. In various examples, the test program can be constantly running in the background or be triggered by an event, such as not receiving a response upon sending a data packet via the wireless communication network 21.

For example, when an application on the mobile device uses the wireless communication network 21 to receive data packets therefrom but does not receive a response a predetermined number of times within a time period, then before requesting to reset its radio channel (e.g., a 3G Evolution-Data Optimized (EVDO) data connection in 3G or Internet data session in 4G) with the wireless communication network 21 (which is typically performed, consuming additional network resources), the test program (running on the mobile device 13*a*) contacts the dummy server 41 with a DNS query. If there is no response from the dummy server 41, the test program interprets this as a network (e.g., connection) failure, and thus, not a situation where a predetermined criterion has been met. Put differently, if there is no response to a DNS query, it is indicative that an account resource has not been depleted; indicating, rather, that there is a connection failure with the wireless communication network 21. However, if there is a response from the dummy server 41, the test program interprets the response as the wireless communication network 21 choosing not to provide account services because the data usage has met at least one predetermined account criterion.

In one example, a client triggers a pop-up message on the mobile device 13*a* offering different subscription or replenishment options upon determining (i.e., based on the response from the dummy server) that an account criterion has been met. For example, the user may be notified that their account has run out of money, has reached a data limit, or is under a data restriction. In one example, an option is provided to allow the user of the mobile device (e.g., 13*a*) to suspend their service, or the service of individual mobile devices under the user's account (e.g., 13*a* to 13*f*), until the next billing cycle rolls around so the account does not enter into overages. Further, a client restricts communications of the mobile device communication with the network. For example, applications on the mobile device can no longer automatically ping the wireless communication network 21. Such blocking and/or deactivating the automatic network access at the mobile device (e.g., 13*a*) level preserves network and communication resources. The blocking/deactivation may be performed by the same client that triggers the pop-up message or a separate client.

In one example, all automatic (e.g., not manually/user-triggered) communication requests from applications on the mobile device are deactivated by the client blocking the IP stack with respect to internet traffic. Thus, automatic pinging of the network is prevented unless it is specifically initiated by the mobile device user. Put differently, a request to communicate via the network that is initiated by the mobile device user is treated differently from automatic pinging by applications of the mobile device. In this regard, a user request to communicate via the network may result in the user being redirected on their mobile device to a web-site that can provide replenishment or a modification of their account (i.e., subscription plan). Accordingly, repeated pinging (e.g., access requests) of the network by a mobile device that has met a predetermined account criterion is prevented, thereby saving network resources and the battery power of the mobile device 13*a*.

In a further example of a method of determining whether data usage of an account associated with a mobile device 13*a* has met one or more account criterion, an OCS server 208 detects real-time mobile device 13*a* data usage and a present time. The OCS server 208 accesses the account data for the mobile device 13a and determines a usage data limit. In one example, it also determines an account cycle. The account data is stored in the OCS server 208 or in a separate server. A calculation is performed, based on the real-time mobile device data usage, the usage data limit, the present time, and the account cycle, to determine a current usage amount and a time remaining in the cycle. The data usage is calculated at the present time to determine whether the usage data limit has been exceeded. If there is an event corresponding to a trigger defined by allocated usage, the OCS server 208 detects that event and prevents the mobile device 13a from being able to use the wireless communication network resources under the subscription plan. For example, upon the OCS server 208 determining in real time that the current data usage limit is exceeded, the mobile device 13a no longer receives responses via the wireless communication network 21. The mobile device 13a may attempt to use the wireless communication network 21 automatically or manually (e.g., dialing a phone number or trying to access a web page). When the mobile device 13a fails to access the wireless communication network 21 a predetermined number of times (e.g., within a predetermined period) then the test program on the mobile device 13a sends a test signal (e.g., DNS query) to the dummy server (DNS server 41). If there is a response from the DNS server 41, a client on the mobile device 13a prevents further pinging of the wireless communication network 21. In one example, automatic access of the wireless communication network 21 is prevented unless it is initiated by the mobile device 13a user. In one example, a notification message is provided on a user interface of the mobile device 13a with a suggestion to either replenish the account or to change to a different subscription plan.

As discussed above, system 10 also includes a DNS server 41, which is coupled for communication via the private network 35. The DNS server 41 is configured to receive queries from wireless devices. In response, the DNS server 41 generates a confirmation message to the respective wireless device (e.g., 13a). A response is generated by the DNS server 41 regardless of whether an account threshold is met. For example, even if the mobile device 13a may have depleted one or more account resources, the DNS server 41 provides a response back to the same. The response from the DNS server 41 indicates to the wireless device 13a that at least one account criterion has been met (e.g., the account has exceeded a data usage limit). The DNS server 41 may be implemented on a single hardware platform. However, to provide effective notification services for a large number of customers and a large volume of trigger events, the DNS server 41 for the associated example of usage notification service and other enterprise applications requiring notification may utilize a distributed system architecture.

In one example, the carrier of the wireless communication network 21 also offers its subscribers on-line access to a variety of functions related to the subscribers' accounts, such as review of billing statements and usage data, on-line payment, subscription changes, password control or the like. For that purpose, the carrier in our example operates a customer account web server 43, providing a subscriber interface via the Internet. Hence, a user's terminal, such as PC 31, may be used to access on-line information about a subscriber's account, which the mobile carrier makes available via the carrier's web site accessible through the Internet 29.

FIG. 2 illustrates a high level interface block diagram depicting an exemplary system which provides network usage notification messages to a mobile device. For example, the System Architecture Evolution (SAE) 20 is the core network architecture of Third Generation Partnership Project's (3GPP's) Long Term Evaluation (LTE) wireless communication standard. The SAE 20 has a flat, all-IP architecture with separation of control plane and user plane traffic. The SAE 20 system includes Mobility Management Entity (MME) 202, Home Subscriber Server (HSS) 204, and the Policy Control and Charging Rules Function (PCRF) 206, which are part of the network 35 of FIG. 2. As will be described in a later section, eNB 19 is an enhanced base station (BS) that acts as an interface between the mobile device and the mobile network. MME 202 is a control-node for the communication access network. For example, it is used for idle mode mobile device tracking and paging procedure including retransmissions. It also provides bearer channel activation/deactivation process and selection of the serving gateway (SGW) 212 for the mobile device (e.g., 13e). MME 202 also provides authentication of the user by interacting with the Home Subscriber Server (HSS) 204. The MME 202 also terminates the S6a interface towards the HSS 204 for roaming mobile devices 13e and 13f.

The Home Subscriber Server (HSS) 204 is a central database that contains user-related and subscription-related information. The HSS 204 provides features such as mobility management, call and session establishment support, user authentication and access authorization. For example, the HSS stores the Mobile Station International Subscriber Directory Number (MSISDN), the SIM-card identification information, and the like.

The Packet Data Network (PDN) Gateway (PGW) 107 provides connectivity from the mobile devices 13e and 13f to external packet data networks. It is a point of exit and entry of traffic for the mobile devices 13e and 13f of FIG. 2. The PGW server 107 monitors how much data is used by a mobile device (e.g., 13e, and 130 at any given time.

The Policy Control and Charging Rules Function (PCRF) 206 provides for policy control decision-making, as well as for controlling the flow-based charging functionalities in the Policy Control Enforcement Function (PCEF), which resides in the PGW 107. The PCRF 206 provides the QoS authorization that decides how certain data flow is treated in the PCEF and ensures that this is in accordance with the user's subscription profile.

The OCS server 208 provides real time credit control and charging for communication services. For example, it provides an account balance management function, credit control information, and allows a communications service provider to charge their customers, in real time, based on service usage. The OCS server 208, instructs the POW server 107 how much data the user is allowed to use (e.g., data quota). The OCS server 208 determines whether a predetermined account criterion has been met.

The Serving Gateway (SGW) 212 routes and forwards data packets to the mobile devices 13e and 13f through the MME 202. The SGW 212 manages and stores mobile device parameters of the IP bearer channel service, including network internal routing information.

Figure 3:
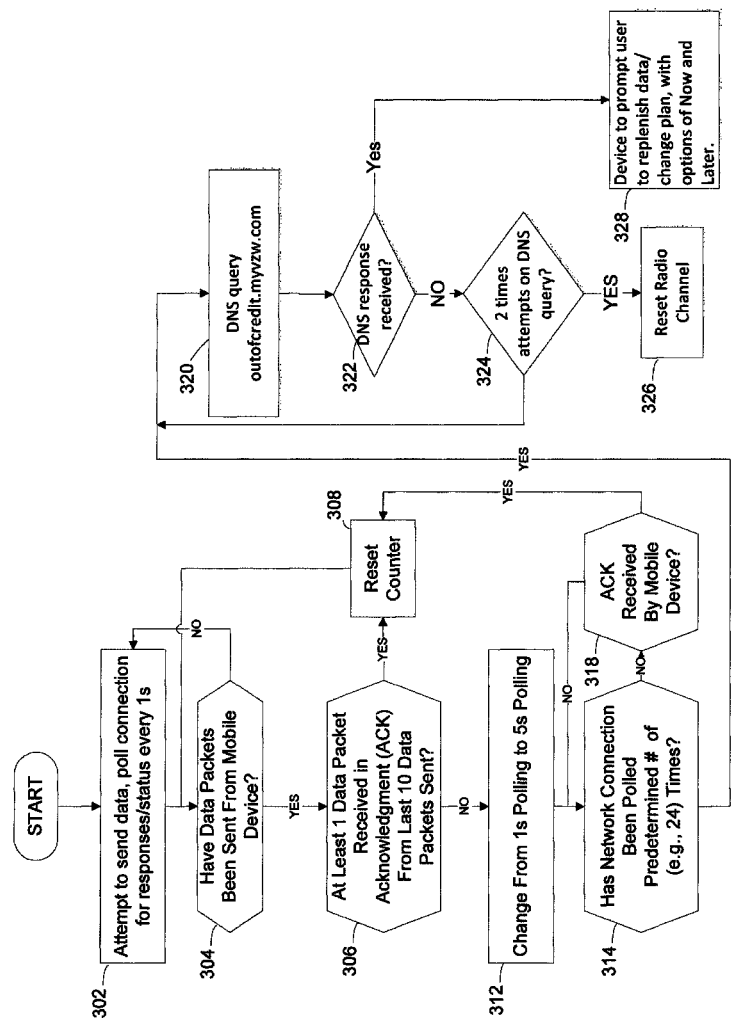
FIG. 3 illustrates an exemplary high level flow-chart of a process on the mobile device that prevents automatic pinging of the network.

With the foregoing overview of the system, it may be helpful now to consider a high-level discussion of a blocking of communication over a wireless communication network when data usage has met at least one predetermined account criterion. FIG. 3 illustrates an exemplary high level flow-chart that prevents automatic pinging of the network by the mobile device.

In step 302 the mobile device (e.g., 13) sends data through the wireless communication network 21 under its subscription plan. It polls its connection to the network periodically (e.g., every second) for a response to the data packets that have just been sent. The mobile device 13 continues the periodic monitoring until a data packet is sent through the network 21 by the mobile device 13 (i.e., step 304).

In step 306, upon sending a data packet, the mobile device 13 determines whether at least one packet is received in acknowledgment of the last several (e.g., 10) data packets sent through the network 21. If so, in step 308, the counter is reset. Otherwise, the counter is incremented and the method continues with step 312 below.

In step 312, the polling is changed from the first period to a second period (e.g., from every 1 second to every 5 seconds). For example, by extending the period the power consumption is further reduced. Thus, in one example, the mobile device 13 polls the network 21 as in step 302 but at a longer period.

In step 314, the mobile device 13 determines whether network has been polled a predetermined number of times (e.g., 24). If so, in step 318 the method continues polling the network until it receives an acknowledgment to the polling (e.g., in response to the out-going data packets from the mobile device 13). Otherwise, the method continues with step 308, where the counter is reset.

However, if the mobile device 13 determines that the network has been polled a predetermined number of times, unlike a conventional approach, in which the mobile device 13 continues pinging the network and then resetting its radio channel until it achieves successful communication with the network 21, here the mobile device 13 only resets its radio channel once it is determined that it is unable to communicate with the network using the current radio channel. Accordingly, network resources and battery life are conserved as the mobile device 13 does not continue pinging the network to request access indefinitely, which may result in significant overhead in terms of network resources.

Thus, in step 320, upon not receiving a response via the network after pinging the network a predetermined number of times, an application on the mobile device (e.g., test program) sends a test signal (e.g., a DNS query) to the dummy server (DNS server 41). For example, the dummy server 41 may be dedicated to simply provide responses to mobile devices regardless of whether an account criterion is met.

In step 322, if a DNS response is received from the dummy server 41, the test program concludes that there is no network connection failure; rather, the network is choosing not to provide account services because the data usage has met at least one predetermined criterion. In this regard, in step 328, the test program prevents additional automatic pinging of the network by the mobile device 13. In one example, a notification (e.g., generated by the mobile device 13 itself or PGW server 107) is provided on a user interface of the mobile device 13 indicating that at least one predetermined account criterion has been met. In other embodiments, an email/SMS message may be sent (in addition to or instead of the notification) from the PGW server 107 or other network device in response to the inquiry, and which is allowed to be transmitted to the mobile device 13, although communication is not normally permitted by the network as the data quota has been exceeded.

If there is no response from the dummy server 41, in one example, the mobile device 13 attempts a DNS query with the dummy server 41 a predetermined number of times (e.g., 2) in step 324. For example, the number of times the mobile device 13 attempts a DNS query is based on a balance between a confidence level in the monitoring of the response and power consumption considerations. Thus, the more attempts, the higher the confidence level, but the more power is consumed. When a response is not received after the predetermined number of attempts, in step 326 the radio channel is reset. For example, the test program interprets a lack of response from the dummy server (as well as the wireless communication network) as a network (e.g., connection) failure, and thus, not a condition where a predetermined criterion has been met. Put differently, if a response to a DNS query is not received (e.g., after repeated attempts within a period), it is indicative that an account resource has not been depleted; rather, it is indicative that there is a connection failure with the wireless communication network 21. However, if there is a response from the dummy server 41, the test program interprets the response as the wireless communication network 21 choosing not to provide account services because the data usage has met at least one predetermined account criterion.

In various examples all or some of the steps according to FIG. 3 can be implemented at the application program level or operating system (OS) level. In one example, steps 320 to 328 are implemented at an (e.g., Android, etc.) OS level instead of a mobile application level, such as a test program.

Figure 4:
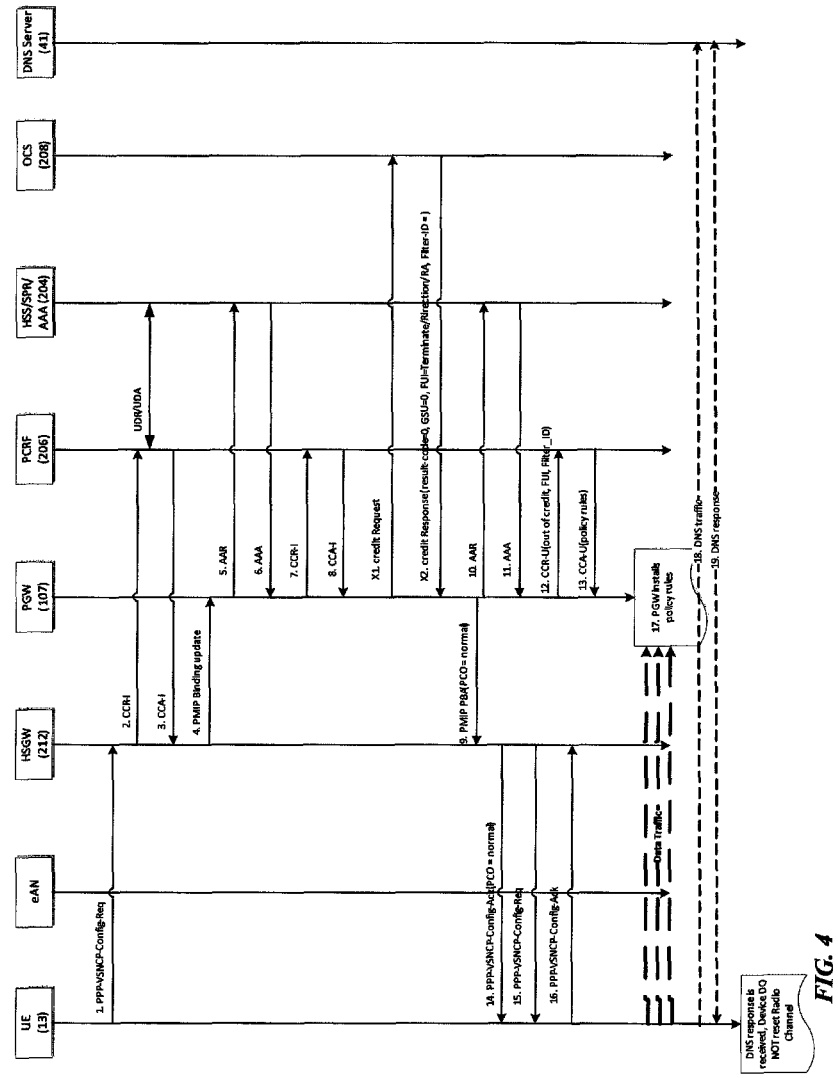
FIG. 4 illustrates an exemplary 3G Evolved High Rate Packet Data call flow where an account holder is out of credit before session start.

Perhaps it may be helpful now to consider high-level discussions of call flows that prevent unnecessary pinging of the network under different scenarios. FIG. 4 illustrates an exemplary 3G Evolved High Rate Packet Data (eHRPD) call flow where an account holder is out of credit before session start. It should be noted that eHRPD allows the mobile operator to upgrade their existing HRPD packet core network using elements of the SAE/EPC architecture. For example, eHRPD is an evolutionary path to LTE which provides seamless service mobility between the eHRPD and LTE networks. For example, eHRPD has the ability to provide seamless service mobility between High Rate Packet Data (HRPD) and LTE access networks with a single mobility management protocol. The operator can leverage the benefit of optimized handover (e.g., no dropped sessions and reduced handover latency) between LIE and eHRPD.

In step 1, the mobile device (UE 13) sends a message (e.g., PPP-VSNCP-Config-Req) message over the wireless communication network 21 to the HSGW 212 to set up an internet Packet Data Network (PDN) connection.

In step 2, the HSGW 212 initiates a Gateway Control Session Establishment by sending a Credit Control Request (CCR) (e.g., Session-ID, INITIAL, APN) message to the PCRF 206 to obtain the rules for the HSGW 212 for this bearer. The Access Point Name (APN) requested, along with the IMSI-NAI is used by the PCRF 206 to determine the QoS-rules to be installed for this bearer.

In step 3, the PCRF 206 responds to the PGW 107 control session establishment by sending a Credit Control Answer (CCA) (e.g., Session-ID, INITIAL, [QoS-Rules], Event Triggers) for the bearer.

In step 4, the HSGW 212 sends a Proxy Binding Update {e.g., IMSI-NAI, Lifetime, Access Technology Type option, APN, HNP=0+IPv4 HoA, PCO (2×IPv6/IPv4 DNS addresses), Additional parameters, GRE Key, BSID, Link-local-addr} to the PGW 107 in order to establish the new registration.

In step 5, the PGW 107 sends an Authentication Authorization Request (AAR) {e.g., Session-ID, PGW-FQDN, IMSI-NAI, APN, [RAT-Type]} to the 3GPP Authentication, Authorization, and Accounting (AAA) to authorize the APN for the subscriber and to update the PGW 107 address on the Home Subscriber Server (HSS) 204 for the APN.

In step 6, the 3GPP AAA server 204 sends the retrieved Subscriber-APN profiles from the HSS for the mobile device 13.

In step 7, the PGW 107 sends an indication of Internet Protocol Connectivity Access Network (IP-CAN) establishment to the PCRF 206 with CCR (e.g., Session-ID, INITIAL, IMSI-NAI, IP-RAT Type, APN, PGW-Address, UE IPv4/IPv6 addresses) to indicate establishment of a new IP-CAN session.

In step 8, the PCRF 206 acknowledges the IP-CAN Session Establishment with a CCA (e.g., Session-ID, INITIAL, Result-Code, PCC Rules, Event Triggers) message. In one example, this message includes the Policy and Charging rules that the PGW 107 will enforce and triggers for events that should be reported by the PGW 107.

In step x1, the PGW 107 sends a Credit Control Request Initial (CCR-I) message to the OCS 208 to validate the subscriber of the mobile device 13.

In step x2, the OCS 208 responds to the PGW 107 to indicate that subscriber is out-of-credit.

In step 9, the PGW 107-Leg responds with a Proxy Mobile IP (PMIP) Binding Acknowledgement {e.g., IMSI-NAI, Lifetime, UE Address Info (HNP+IID, IPv4 address), PCO (2×IPv6/IPv4 DNS addresses), Additional Parameters, IPv4 Default Router Address, Link-local address, Charging ID} message to the HSGW 212. For example, the IP address is assigned to the mobile device 13.

In step 10, after the Internet Protocol version 4 (IPv4) addresses have been assigned, the PGW 107 sends an Authentication Authorization Request (AAR) (e.g., Base AVPs, Framed-IPv6-Prefix, Framed-Interface-Id) to the 3GPP-AAA 204.

In step 12, the PGW 107 sends a Credit Control Request Update (CCRU) to the PCRF 206 to request for the new policy rules to be installed (e.g., due to customer being out-of-credit).

In step 13, the PCRF 206 responds to the PGW 107 with the new policy rules.

In steps 14 to 16, the IP address is delivered to the mobile device 13.

In step 17, the PGW 107 installs the new rules. For example, with the new rules installed, the PGW 107 starts dropping all chargeable data packets, except DNS traffic with the DNS server 41 (e.g., outofcredit.myvzw.com).

In step 18, the mobile device 13 now cannot receive any incoming acknowledgement for the outgoing data packets. In this regard, the mobile device 13 sends a DNS query to the DNS server 41 (e.g., outofcredit.myvzw.com). For example, the specific DNS traffic goes through PGW 107 and reaches the DNS server 41.

In step 19, the DNS server 41 (sometimes referred herein as a "dummy server") responds, thereby indicating to the mobile device 13 that the wireless communication network 21 is functional and that there is a successful connection between the mobile device 13 and the wireless communication network 21. In one example, the DNS server 41 is a dedicated response server configured to provide acknowledgments to a mobile device to indicate to the mobile device that the wireless communication network 21 is functional. For example, when an acknowledgment is received from the DNS server 41, the mobile device 13 does not reset radio channel. For example, a response from the DNS server 41 is indicative that the mobile device 13 has met a predetermined account criterion (e.g., has run out of data in its subscription plan).

Figure 5:
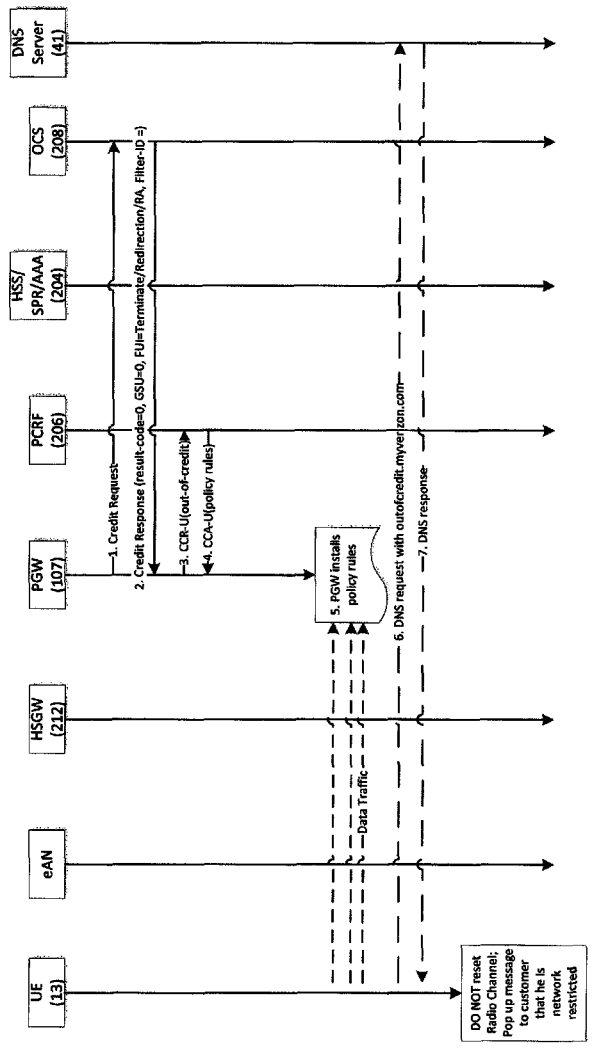
FIG. 5 illustrates an exemplary 3G Evolved High Rate Packet Data call flow where an account holder runs out of credit in the middle of an active session.

Reference now is made to FIG. 5, which illustrates an exemplary 3G Evolved High Rate Packet Data (eHRPD) call flow where an account holder runs out of credit in the middle of an active session. For example, the mobile device 13 is in communication through an eHRPD network and is presently consuming data from its subscription plan.

In step 1, the customer, while in the middle of a call session on the mobile device 13, uses up the assigned data quota. In this regard, the PGW 107 sends a message to the online charging system (OCS) 208 to request a new data quota.

In step 2, the customer has $0 on his account (e.g., the data usage on the account has met a predetermined account criterion). The OCS 208 returns a Granted Service Unit (GSU) message=0 with a Final Unit Indicator (FUI) and a Final Unit Action (FUA).

In step 3, based on the FUI/FUA of step 2, the PGW 107 recognizes that the customer (e.g., associated with mobile device 13) is out-of-credit. For example, the PGW 107 sends a request to PCRF 206 for policy rules to apply to the mobile device number (MDN) of the mobile device 13.

In step 4, the PCRF 206 sends the new policy rules to the PGW 107.

In step 5, the PGW 107 installs the new policy rules. For example, the new policy rules instruct the PGW 107 to keep the Point to Point Protocol (PPP) data session up and drop all the data packets except DNS traffic to and/or from the DNS server 41 (e.g., domain outofcredit.myvzw.com).

In step 6, the mobile device 13 cannot receive any incoming acknowledgement for the outgoing data packets. For example, the user of the mobile device 13 may not be aware that they ran out of credit. Upon not receiving an acknowledgment via the network 21 (e.g., after a predetermined number of attempts in a period), the mobile device 13 sends a DNS query to the DNS server 41 (e.g., outofcredit.myvzw.com). For example, this specific DNS traffic goes through PGW 107 and reaches the DNS server 41. In one example, the DNS server 41 is a dedicated response server that is configured to provide acknowledgments to a mobile device to indicate to the mobile device that the wireless communication network 21 is functional.

In step 7, the DNS server 41 responds. For example, when an acknowledgment is received from the DNS server 41, the mobile device 13 does not reset radio channel. For example, a response from the DNS server 41 is indicative that the mobile device 13 has met a predetermined account criterion (e.g., has run out of data in its subscription plan).

Figure 6:
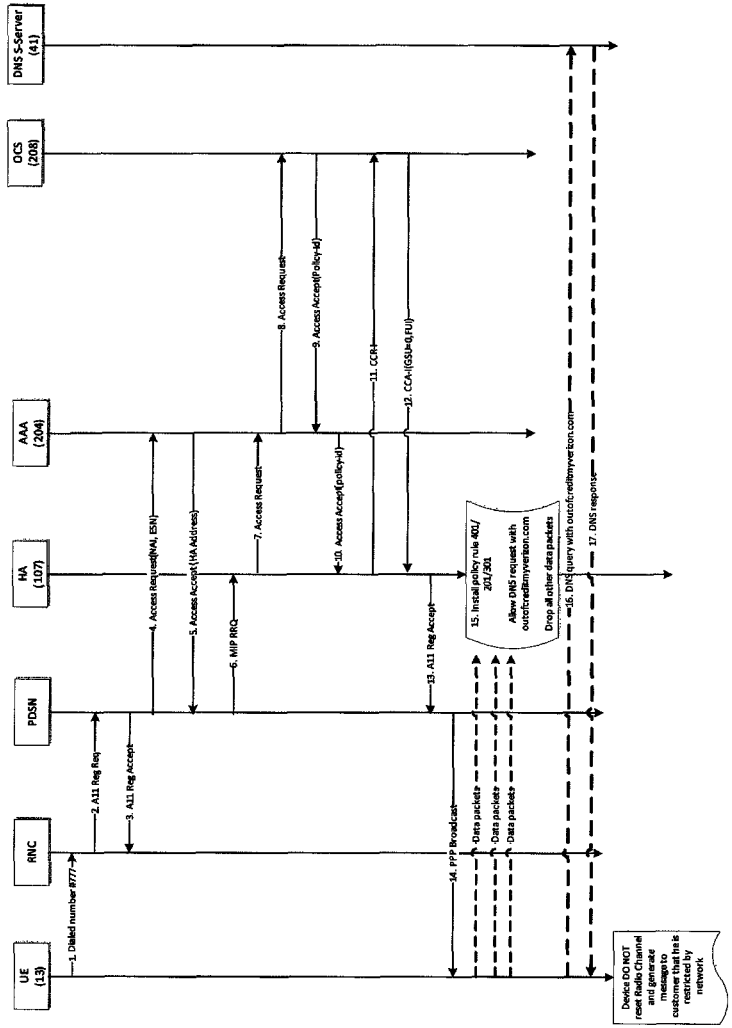
FIG. 6 illustrates an exemplary 3G Evolution-Data Optimized call flow where an account holder is out of credit before session start.

Reference now is made to FIG. 6, which illustrates an exemplary 3G Evolution-Data Optimized (EVDO) call flow where an account holder is out of credit before session start. For example, the mobile device 13 is in communication through an eHRPD network and is presently consuming data from its subscription plan. EVDO is a telecommunications standard for the wireless transmission of data through radio signals, such as broadband Internet access. It uses multiplexing techniques including code division multiple access (CDMA) as well as time division multiplexing (TDM) to maximize both individual users' throughput and the overall system throughput. It is standardized by 3rd Generation Partnership Project 2 (3GPP2) as part of the CDMA2000 family of standards and has been adopted by many mobile phone service providers around the world—particularly those previously employing CDMA networks.

In step 1, the customer may use the mobile device 13 to attempt to create a data connection with the wireless data communication network 21. For example, a number (e.g., #777) is dialed on the mobile device 13 to automatically attach to a radio network (e.g., 21).

In steps 2 to 3, the Radio Network Controller (RNC) performs an A11 registration with the Packet Data Serving Node (PDSN).

In step 4, the PDSN sends an Access-Request to the AAA 204.

In step 5, the AAA 204 responds with an Access-Accept to the PDSN. For example, the Home Agent (HA) 107 address is provided within the Access-Accept message.

In step 6, the PDSN sends a mobile IP (MIP) Registration request to the HA 107 address that is provided by the AAA 204 at step 5.

In step 7, the HA 107 receives MIP Registration request message from the PDSN. For example, the HA 107 sends an Access-Request to the AAA 204 to validate the customer.

In step 8, the AAA 204 identifies that this customer is, for example, a "prepay" customer. In this regard, the AAA 204 forwards the Access-Request message to the OCS 208.

In step 9, the OCS 208 returns the policy-ID within the Access-Accept message.

In step 10, the AAA 204 forwards the Access-Accept with the policy-ID value to the HA 107. For example, the HA 107 receives the Access-Accept message and the store policy-ID information.

In step 11, the HA 107 sends a Credit Control Request Initial (CCR-I) message to the OCS 208 directly (e.g., to request quota).

In step 12, the OCS 208 responds with a Credit Control Answer Initial (CCA-I) message to the HA 107 with a Granted-Service-Unit (GSU)=0 and a Final Unit indicator (FUI).

In steps 13 and 14, the HA 107 assigns the IP address to the mobile device 13 and includes the IP address in the MIP registration response message to the PDSN.

In step 15, the HA 107 triggers the new rules based on the GSU and FUI from step 12. For example, the new policy rules instruct the HA 107 to keep the Point to Point (PPP) data session active and drop all the data packets except DNS traffic to and/or from the DNS server 41 (e.g., outofcredit.myvzw.com).

In step 16, the mobile device 13 cannot receive an incoming acknowledgement for the outgoing data packets. For example, the user of the mobile device 13 may not be aware that they ran out of account credit. Upon not receiving an acknowledgment via the network 21 (e.g., after a predetermined number of attempts in a period), the mobile device 13 sends a DNS query to the DNS server 41 (e.g., outofcredit.myvzw.com). For example, this specific DNS traffic goes through PGW 107 and reaches the DNS server 41. In one example, the DNS server 41 is a dedicated response server configured to provide acknowledgments to a mobile device to indicate to the mobile device 13 that the wireless communication network 21 is functional.

In step 17, the DNS server 41 responds. For example, when an acknowledgment is received from the DNS server 41, the mobile device 13 does not reset the radio channel. For example, a response from the DNS server 41 is indicative that the mobile device 13 has met a predetermined account criterion (e.g., has run out of data in its subscription plan).

Figure 7:
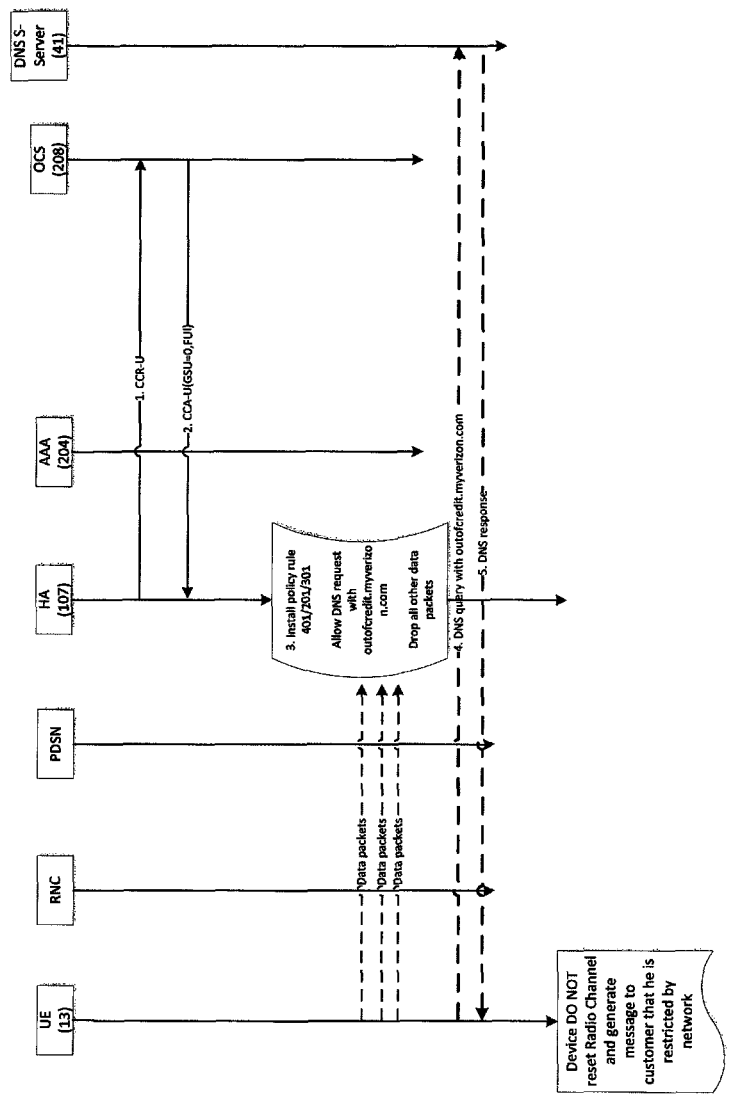
FIG. 7 illustrates an exemplary 3G Evolution-Data Optimized call flow where an account holder runs out of credit in the middle of an active session.

Reference now is made to FIG. 7, which illustrates an exemplary 3G Evolution-Data Optimized (EVDO) call flow where an account holder runs out of credit in the middle of an active session.

In step 1, the customer, while in the middle of a call session on the mobile device 13, uses up the assigned data quota. In this regard, the HA 107 sends a message to the online charging system (OCS) 208 to request a new data quota.

In step 2, the customer has $0 on his account (e.g., the data usage on the account has met a predetermined account criterion). The OCS 208 returns a Granted Service Unit (GSU) message=0 with a Final Unit Indicator (FUI) and a Final Unit Action (FUA).

In step 3, based on FUI/FUA of step 2, the HA 107 recognizes that the customer (e.g., associated with mobile device 13) is out-of-credit. For example, new policy rules instruct the HA 107 to keep the PPP data session up and drop the data packets except DNS traffic to and/or from the DNS server 41 (e.g., outofcredit.myvzw.com).

In step 4, the mobile device 13 can not receive any incoming acknowledgement for the outgoing data packets. For example, the user of the mobile device 13 may not be aware that they ran out of credit. Upon not receiving an acknowledgment via the network 21 (e.g., after a predetermined number of attempts in a period), the mobile device 13 sends a DNS query to the DNS server 41 (e.g., outofcredit.myvzw.com). For example, this specific DNS traffic goes through HA 107 and reaches the DNS server 41. In one example, the DNS server 41 is a dedicated response server configured to provide acknowledgments to a mobile device to indicate to the mobile device that the wireless communication network 21 is functional.

When the mobile device 13 cannot receive an incoming acknowledgement for the outgoing data packets, the mobile device 13 sends a DNS query to the dummy server (e.g., having a domain outofcredit.myvzw.com). For example, the DNS traffic goes through PGW server 107 and reaches the dummy server (e.g., DNS server 41).

In step 5, the DNS server 41 responds. For example, when an acknowledgment is received from the DNS server 41, the mobile device 13 does not reset radio channel. For example, a response from the DNS server 41 is indicative that the mobile device 13 has met a predetermined account criterion (e.g., has run out of data in its subscription plan).

Figure 8:
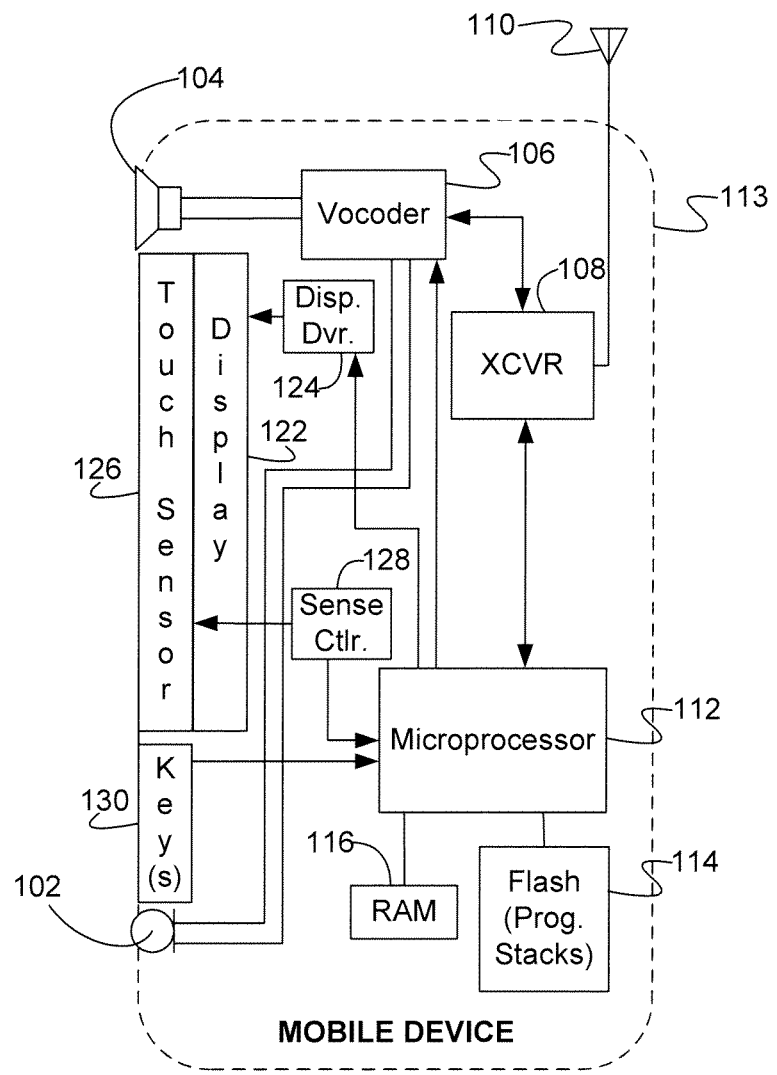
FIG. 8 illustrates a high level simplified function block diagram of an exemplary mobile device.

As shown by the discussion of the FIGS. 1 to 7, functions for enabling a mobile device to determine whether data usage by the device has met at least one predetermined account criterion and blocking of pinging of the network discussed herein involves an appropriately configured mobile device 13. It may be useful to consider the functional elements/aspects of an exemplary mobile device, at a high-level. For purposes of such a discussion, FIG. 8 provides a block diagram illustration of an exemplary mobile device 13. Although the mobile device 13 may be a handset type mobile phone or may be incorporated into another device, such as a personal digital assistant (PDA), a tablet computer, a PERS wearable device, or the like. For discussion purposes, the illustration shows the mobile device 13 in the form of a handheld smart-phone. The smart-phone example of the mobile device 13 may function as a normal digital wireless telephone station. The mobile device 13 includes a display 122 for displaying messages, location information, pseudo-hold messages, or the like, call related information dialed by the user, calling party numbers, etc. The mobile device 13 also includes a touch/position sensor 126. The sensor 126 is relatively transparent, so that the user may view the information presented on the user output (i.e., display) 122. A sense controller 128 sensing signals from elements of the touch/position sensor 126 and detects occurrence and position of each touch of the screen formed by the display 122 and sensor 126. The sense circuit 128 provides touch position information to the microprocessor 112, which correlates that information to the information currently displayed via the display 122, to determine the nature of user input via the screen.

The display 122 and touch sensor 126 (and possibly one or more keys 130, if included) are the physical elements providing the textual and graphical user interface for the mobile device 13. The microphone 102 and speaker 104 may be used as additional user interface elements, for audio input and output. Of course, other user interface elements may be used, such as a trackball, as in some types of smart phones or tablets.

In one example, the mobile device 13 may also include a haptic element (not shown) to provide haptic feedback to the user. Various combinations of the keypad 120, display 122, microphone 102, haptic element, and speaker 104 may be used as the physical input output elements of the graphical user interface (GUI), for multimedia (e.g. audio and/or video) communications. Of course other user interface elements may be used, such as a stylus and touch sensitive display screen, as in a PDA, tablet computer, or smart phone. In addition to normal telephone and data communication related input/output (including message input and message display functions), the user interface elements also may be used for display of notifications and other information to the user and user input of selections, for example, including any needed to replenish or change an account.

In the example of FIG. 8, a microprocessor 112 serves as a programmable controller or processor, in that it controls all operations of the mobile device 13 in accord with programming that it executes, for all normal operations, and for operations involved in sending a test message to the dummy server and determining whether an account criterion has been met. In the example, the mobile device 13 includes flash type program memory 114, for storage of various "software" or "firmware" program routines and mobile configuration settings, such as mobile telephone number (MTN or MDN), etc. The mobile device 13 may also include a non-volatile random access memory (RAM) 116 for a working data processing memory. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112. Accordingly, the mobile device 13 includes a processor, and programming stored in the flash memory 114 configures the processor so that the mobile device is capable of performing various desired functions, including determining whether an account criterion has been met and preventing or blocking network pinging originating from the mobile device 13.

As shown by the above discussion, functions for enabling a mobile device to determine whether data usage by the device has met at least one predetermined account criterion may be implemented on computers connected for data communication via the components of a packet data network, operating as the system of record 39, OCS 208, customer account web server 43, DNS server 41, and/or mobile device (e.g., 13a to 13f) as shown in FIGS. 1 and 2. Although special purpose devices may be used, such devices also may he implemented using one or more hardware platforms intended to represent a general class of data processing device commonly used to run "server" programming so as to implement the network status information functions discussed above, albeit with an appropriate network connection for data communication.

FIGS. 9 and 10 provide functional block diagram illustrations of general purpose computer hardware platforms. FIG. 9 illustrates a network or host computer platform, as may typically be used to implement a server. FIG. 10 depicts a device with user interface elements, as may be used to implement a personal computer, such as computer 31 of FIG. 1 or a workstation, or to implement a mobile device, such as a portable handset, a smart-phone, tablet computer, a personal digital assistant or other type of mobile station or mobile terminal device (e.g., devices 13a to 13f of FIGS. 1 and 2), although the device of FIG. 10 may also act as a server if appropriately programmed. It is believed that the general structure and general operation of such equipment as shown in FIGS. 9 and 10 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run server programming, for example, to provide account status information to the mobile device so as to function as one of the servers 39, 41, 43, and 208 in FIG. 1.

A user terminal such as a general-purpose personal computer or a mobile device typically comprises a central processor or other processing device, an internal communication bus, various types of memory or storage media (RAM, ROM, EEPROM, cache memory, disk or flash drives for mass storage, etc.) for code and data storage, and one or more network or communication interfaces or ports for communication purposes.

The software functionalities involve programming, including executable code as well as associated stored data, e.g., files used for applications on the mobile device to block network access and/or provide notifications and/or instructions on a user interface of the mobile device. The software code is executable by the mobile device. In operation, the code is stored within the mobile device. At other times, however, the software may be stored at other locations and/or transported for loading into the appropriate mobile device system. Execution of such code by a processor of the mobile device enables the mobile device to perform functions of determining that the wireless communication network is not responding, contacting a dummy server (e.g., DNS server) to determine whether a lack of response is due to problems with network connectivity or having met a predetermined criterion such as exceeding data usage under the plan, and preventing automatic pinging of the mobile device, in essentially the manner performed in the implementations discussed and illustrated herein.

Hence, aspects of the methods of receiving and processing network status information as outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

APPENDIX: ACRONYM LIST

The description above has used a large number of acronyms to refer to various services, notification messages, and system components. Although generally known, use of several of these acronyms is not strictly standardized in the art. For the convenience of the reader, the following list correlates terms to acronyms, as used by way of example in the detailed description above.

3GPP2—3'rd Generation Partnership Project 2
AAA—Authentication. Authorization, and Accounting
AAR—Authentication Authorization Request
AH—Account Holder
APN—Access Point Name
BS—Base Station
BTS—Base Transceiver System
CCA—Credit Control Answer
CCA-I—Credit Control Answer Initial
CCR—Credit Control Request
CCR-I—Credit Control Request Initial
CCRU—Credit Control Request Update
CPU—Central Processing Unit
DNS—Domain Name Server
EHRPD—Evolved High Rate Packet Data
EPC—Evolved Packet Core
EPROM—Erasable Programmable Read Only Memory
EEPROM—Electrically Erasable Programmable Read Only Memory
E RAB—Evolved Packet System Radio Access Bearer
EVDO—Evolution-Data Optimized
FLASH-EPROM—Flash Erasable Programmable Read Only Memory
FUI—Final Unit Indication
FUA—Final Unit Action
GSU—Granted Service Unit
HA—Home Agent
HRPD—High Rate Packet Data
HSGW—High Rate Packet Data Serving Gateway
HSS—Home Subscriber Server
IP-CAN—Internet Protocol Connectivity Access Network
IPv4—Internet Protocol version 4 (IPv4)
LTE—Long Term Evaluation
MIP—Mobile Internet Protocol
MME—Mobility Management Entity
MMS—Multimedia Message Service
MMSC—Multimedia Messaging Service Center
MSISDN—Mobile Station International Subscriber Directory Number
OCS—Online Charging System
PC—Personal Computer
PCEF—Policy Control Enforcement Function
PCO—Protocol Configuration Option
PCRF—Policy and Charging Rules Function
PDA—Personal Digital Assistant
PDN—Packet Data Network
PDSN—Packet Data Serving Node
PGW—Packet Data Network Gateway
PMIP—Proxy Mobile IPv6
PPP—Point to Point Protocol
PROM—Programmable Read Only Memory
PSTN—Public Switched Telephone Network
QoS—Quality of Service
RAM—Random Access Memory
RAN—Radio Access Network
RAR—Re-Authorization Request
RNC—Radio Network Controller
ROM—Read Only Memory
RRC—Radio Resource Control
SAE—System Architecture Evolution
SGW—Serving Gateway
SIM—Subscriber Identity Module
SMS—Short Message Service
SPR—Subscription Profile Repository
TDM—Time Division Multiplexing
WAN—Wide Area Network

What is claimed is:

1. A method, comprising steps of:
   (a) establishing a wireless connection between a mobile device and a wireless packet data communication network;
   (b) sending a data packet from the mobile device through the network for communication through the network;
   (c) determining whether a response via the network has been received within a first period;
   (d) repeating steps (b) and (c) a first predetermined number of times or until a response via the network is received;
   (e) upon determining that no response is received via the network after the predetermined number of repetitions, sending a test message to a dummy server;
   (f) determining whether a response to the test message from the dummy server has been received via the network within a second period;
   (g) repeating steps (e) and (f) until the first of: a second predetermined number of repetitions is reached or a response from the dummy server is received via the network;
   (h) upon determining that a response from the dummy server has been received, deactivating or blocking network access requests originating from the mobile device to the network, unless initiated by a user of the mobile device.

2. The method of claim 1, wherein:
   the test message is a DNS query: and
   the dummy server is a DNS server that is configured to receive queries from the wireless device and provide a response regardless of whether a data usage criterion of the mobile device with the wireless packet data communication network has been met.

3. The method of claim 1, further comprising providing a notification on a user interface of the mobile device indicating that a data usage criterion has been met upon determining that a response from the dummy server has been received.

4. The method of claim 3, wherein the notification includes providing an option to one of at least (i) replenish the account or (ii) update a subscription plan with the account.

5. The method of claim 4, further comprising upon receiving user selection of the option, automatically redirecting packet data communications of the mobile device to a web site of an account provider where the option is provided.

6. The method of claim 1, further comprising resetting the wireless connection between the mobile device and the network upon determining that no response to any of the test messages has been received from the dummy server.

7. The method of claim 1, wherein the data usage criterion is at least one of (i) voice call minutes, (ii) data volume downloaded to the mobile device, or (iii) date and time the network is accessed.

8. The method of claim 1, further comprising receiving the response to the test message from the dummy server via the network, regardless of whether a predetermined account criterion is or is not met.

9. The method of claim 1, further comprising upon determining that a response from the dummy server has been received, limiting user-initiated network access to (i) replenish the account or (ii) update a subscription plan with the account.

10. A mobile device, comprising:
    a processor;
    a network interface coupled to the processor configured to enable communications via a wireless packet data communication network;
    a storage device for content and programming;
    a program stored in the storage device, wherein execution of the program by the processor configures the mobile device to perform functions, including functions to:
    (a) establish a wireless connection between a mobile device and a wireless packet data communication network;
    (b) send a data packet from the mobile device through the network for communication through the network;
    (c) determine whether a response via the network has been received within a first period;
    (d) repeat steps (b) and (c) a first predetermined number of times or until a response via the network is received;
    (e) upon determining that no response is received via the network after the predetermined number of repetitions, send a test message to a dummy server;
    (f) determine whether a response to the test message from the dummy server has been received via the network within a second period;
    (g) repeat steps (e) and (f) until the first of: a second predetermined number of repetitions is reached or a response from the dummy server is received via the network;
    (h) upon determining that a response from the dummy server has been received, deactivate or block network access requests originating from the mobile device to the network, unless initiated by a user of the mobile device.

11. The mobile device of claim 10, wherein:
    the test message is a DNS query; and
    the dummy server is a DNS server that is configured to receive queries from the wireless device and provide a response regardless of whether a data usage criterion of the mobile device with the wireless packet data communication network has been met.

12. The mobile device of claim 10, wherein execution of the program by the processor further configures the mobile device to provide a notification on a user interface of the mobile device indicating that a data usage criterion has been met, upon determining that a response from the dummy server has been received.

13. The mobile device of claim 12, wherein the notification includes an option to one of at least (i) replenish the account or (ii) update a subscription plan with the account.

14. The mobile device of claim 13, wherein execution of the program by the processor further configures the mobile device to upon receiving user selection of the option, automatically redirect packet data communications of the mobile device to a web site of an account provider where the option is provided.

15. The mobile device of claim 10, wherein execution of the program by the processor further configures the mobile device to reset the wireless connection between the mobile device and the network, upon determining that no response to any of the test messages has been received from the dummy server.

16. The mobile device of claim 10, wherein the data usage criterion is at least one of (i) voice call minutes, (ii) data volume downloaded to the mobile device, or (iii) date and time the network is accessed.

17. The mobile device of claim 10, wherein execution of the program by the processor further configures the mobile device to receive the response to the test message from the dummy server via the network, regardless of whether a predetermined account criterion is or is not met.

18. The mobile device of claim 10, wherein execution of the program by the processor further configures the mobile device to upon determining that a response from the dummy server has been received, limit user-initiated network access to (i) replenish the account, or (ii) update a subscription plan with the account.

19. A mobile device, comprising:
   a processor;
   a network interface coupled to the processor configured to enable communications via a wireless packet data communication network;
   a storage device for content and programming;
   a program stored in the storage device, wherein execution of the program by the processor configures the mobile device to perform functions whenever the mobile device has packet data to send through the wireless packet data communication network, including functions to:
      repeatedly transmit packet data from the mobile device to the wireless packet data communication network in an attempt to send packet data through the network, up to a first predetermined number of times, upon not receiving a response to data transmission via the network;
      when no response to the data transmission is received via the network after the predetermined number of repetitions, transmit a test message to the wireless packet data communication network in an attempt to send the test message to a dummy server one or more times up to a second predetermined number of times;
      when the mobile device has packet data to send and the mobile device has received a response from the dummy server before transmitting the test message the second number of times, automatically taking an action related to a data usage criterion of an account associated with the mobile device having been met by packet data transmissions of the mobile device through the network; and
      when the mobile device has packet data to send and the mobile device has transmitted the test message the second number of times without a response from the dummy server, continuing to transmit packet data from the mobile device to the wireless packet data communication network in an attempt to send packet data through the network.

20. The mobile device of claim 19, wherein the action comprises providing a notification to a user of the mobile device indicating that the data usage criterion has been met.

21. The mobile device of claim 19, wherein the action comprises stopping transmission of packet data from the mobile device to the wireless packet data communication network in an attempt to send packet data through the network.

22. The mobile device of claim 21, wherein stopping transmission of packet data from the mobile device includes deactivating or blocking automatic network access requests from the mobile device to the network.

* * * * *